(12) United States Patent
Kerr

(10) Patent No.: US 7,316,434 B1
(45) Date of Patent: Jan. 8, 2008

(54) SPRING-ARMED KITCHEN UTENSILS AND LOCKING MECHANISM THEREFOR

(75) Inventor: Helen Kerr, Toronto (CA)

(73) Assignee: Gourmet Settings Inc., Richmond Hill, Ontario (CA)

( * ) Notice: Subject to any disclaimer, the term of this patent is extended or adjusted under 35 U.S.C. 154(b) by 0 days.

(21) Appl. No.: 11/532,403

(22) Filed: Sep. 15, 2006

(51) Int. Cl.
*A47G 21/10* (2006.01)
*A47J 43/28* (2006.01)

(52) U.S. Cl. .......................... 294/16; 294/99.2
(58) Field of Classification Search .............. 294/3, 294/11, 16, 28, 99.2, 106; D7/686
See application file for complete search history.

(56) References Cited

U.S. PATENT DOCUMENTS

| | | | |
|---|---|---|---|
| 3,356,405 A * | 12/1967 | Gruber | ............................ 294/3 |
| 3,953,990 A | 5/1976 | Nagel | |
| 5,199,756 A | 4/1993 | Bartlett et al. | |
| 5,934,721 A | 8/1999 | Walde | |
| 6,056,338 A | 5/2000 | Kerr | |
| 6,089,631 A | 7/2000 | Thurlow et al. | |
| 6,092,847 A | 7/2000 | Kwan | |
| 6,568,728 B1 * | 5/2003 | Wang | ............................ 294/16 |
| 6,726,263 B2 | 4/2004 | Wang et al. | |
| 2004/0239219 A1 | 12/2004 | Kim et al. | |

FOREIGN PATENT DOCUMENTS

WO WO 2004/039228 5/2004

OTHER PUBLICATIONS

OXO Tongs, www.williamsonoma.com, no date.
Lelfhelt "Pro LIne" Cherry Stoner, no date.

* cited by examiner

*Primary Examiner*—Dean J Kramer
(74) *Attorney, Agent, or Firm*—Patterson & Sheridan, LLP

(57) ABSTRACT

A locking utensil is provided. The utensil has a pair of pivoting spring-loaded arms each having a forward functional end and a rear attachment end. The utensil includes a locking assembly, featuring an eccentrically shaped cam disposed in a channel between the arms. One side of the cam has a projecting shoulder dimensioned to frictionally engage an inside surface of the channel when the shoulder side of the cam is rocked into contact with the inside surface. The cam can releasably retain the arms closed to lock them. An actuator tab that extends out of the channel is used to rock the cam into and out of locking engagement.

20 Claims, 5 Drawing Sheets

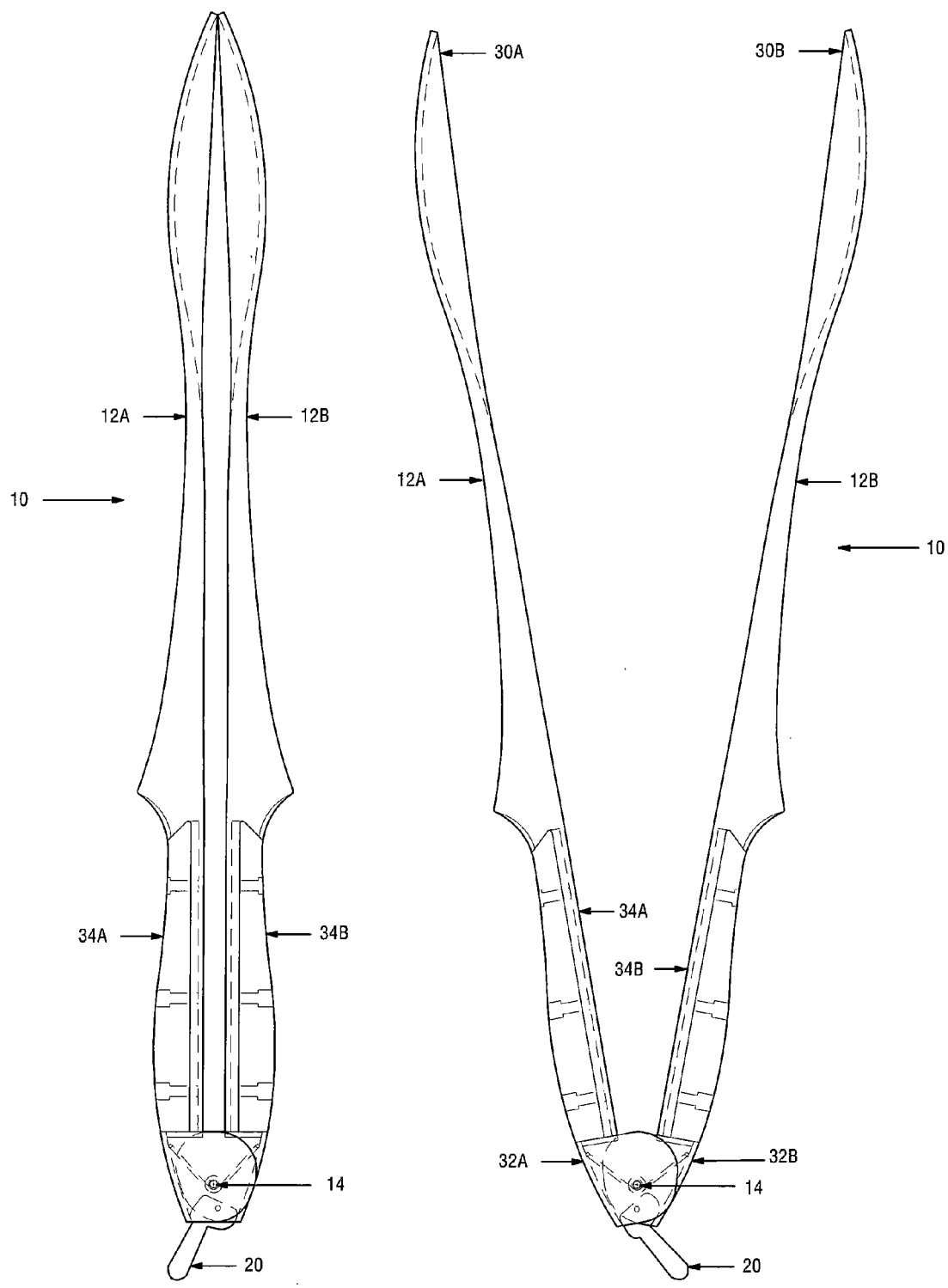

SPRING-ARMED KITCHEN UTENSILS AND LOCKING MECHANISM THEREFOR

BACKGROUND OF THE INVENTION

1. Field of the Invention

The invention relates to spring-armed kitchen utensils.

2. Description of the Related Art

Spring-armed utensils are commonly used in kitchens for gripping or preparing food items. Examples include spring-armed tongs, garlic presses, cherry pitters, and other types of utensils.

It is awkward to store these kinds of utensils when not in use. The arm span when sprung open takes up excessive space in a drawer. The functional ends of the utensils can also get caught on other things, particularly if the ends have any projecting or sharp edges.

Various types of locking mechanisms have been provided, the simplest of which is a loop or ring, which encircles the arms and which can be slid toward the functional ends of the arms when pinched together to retain the arms in closed position. While relatively simple, the loop lock is not ideal, since it can be inadvertently engaged by gravity while the utensil is in active use. The loop lock can also be inadvertently released at undesirable times. Also, such locks are apt to wear out in a short time.

Other types of locks are generally more complicated. Some locks involve shifting the position of a main pivot back into a non-functional position or otherwise blocking the main pivot. Some involve bringing stops together over the length of the arms. Some involve temporarily disabling or blocking the spring. All of these methods cause wear on the moving parts, which must interact to provide the locking function. For this reason, existing locks are less than ideal. Existing locks also use complicated hardware, adding to manufacturing difficulty and expense.

In use, existing locks may be excessively difficult or excessively easy to engage. Ideally, a lock should permit the utensil to be engaged one handed and without the need to contact the forward functional ends which may be dirty or greasy from use. Ideally, the lock should also not be unintentionally engageable.

SUMMARY OF THE INVENTION

A locking utensil is provided. The utensil has a pair of arms each having a forward functional end and a rear attachment end. The arms are nested together at their attachment ends and pivotably fastened together at a main pivot. The nested attachment ends define a channel between them. A spring is disposed in the channel to bias the functional ends of the arms outward to an open position, except when the arms are brought together for gripping an object or for locking the arms in a closed position.

The utensil includes a locking assembly. A cam is disposed in the channel and pivotable therein in a rocking motion independently of the main pivot. The cam is eccentrically shaped and has two opposing sides. One of the sides has a projecting shoulder dimensioned to frictionally engage an inside surface of the channel when the shoulder side of the cam is rocked into contact with the inside surface. Thereby, the cam releasably retains the arms in locking engagement in the closed position. The locking assembly also includes an actuator tab, which extends at least partway out of the channel for rocking the cam side to side into and out of locking engagement.

The cam and the actuator tab may be separate components joined together, or they may comprise a unitary piece. In one possible embodiment, the cam is made of nylon. The actuator tab may also be made of nylon.

The spring is preferably located proximate to the main pivot. In one embodiment, the spring is a torsion spring. Alternatively, the spring may be a leaf spring, or some other form of spring or bias.

The cam preferably has a separate pivot from the main pivot (where the spring is located). Preferably, an arc described by the cam in the rocking motion does not contact the spring at any point.

The cam may further include a second shoulder on the opposite side of the cam from the shoulder. In this embodiment, the second shoulder contacts a second inside surface of the channel when the cam is rocked into locking engagement.

Various materials would be suitable for the utensil. In one possible embodiment, the arms are made from stamped metal, such as stamped steel. The arms may be hollow or solid-body.

The rear attachment ends of the arms comprise flanged ends dimensioned to nest one arm within the other arm.

Likewise, various shapes and utensil types are possible, bearing the present locking mechanism. The utensil may include a handle portion on each arm proximate to the attachment ends. That is, the arms may have a specially designated portion for gripping (either made out of a different material, or specially shaped to facilitate gripping).

Various configurations of functional ends are possible. The functional ends of the arms may be mirror images of each other, or they made be identical, or they may be co-operating but non-matching. The functional ends may have contact surfaces that are substantially flat. Alternatively, the functional ends may have contact surfaces that are substantially bowl-shaped. The functional end may comprise one or more slots.

The utensil may be a gripping utensil, such as a tongs. Or, it may be another kind of processing utensil, such as a pitter, or a press.

According to a second aspect of the invention, a locking mechanism is provided. The features of the locking mechanism are as set out above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is an isometric view of a locking utensil, in this case, locking tongs. The tongs are shown in a closed and locked position.

FIG. 2 is an isometric view of the same locking utensil as FIG. 1, shown in an open and unlocked position.

DETAILED DESCRIPTION

Figure 3:
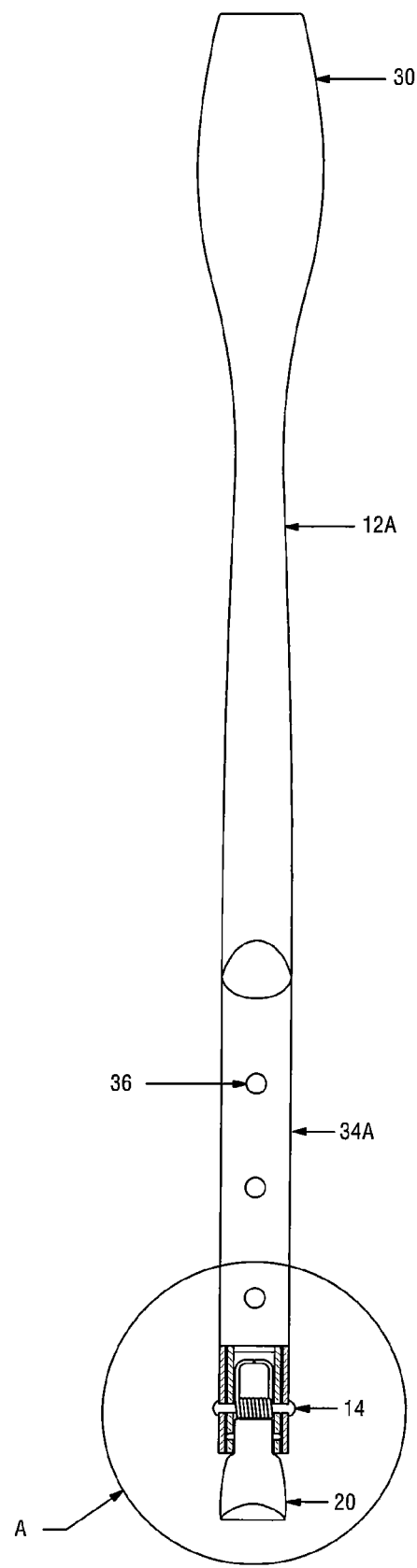
FIG. 3 is a side view of the locking utensil of FIG. 1.

A locking utensil is provided, as shown in the Figures. FIGS. 1-8 show a locking tongs 10, according to an embodiment of the invention. A preferred embodiment of the invention is for barbecue tongs. However, various types of locking utensils are contemplated, and the invention is not limited to the tongs shown in the drawings.

Figure 4:
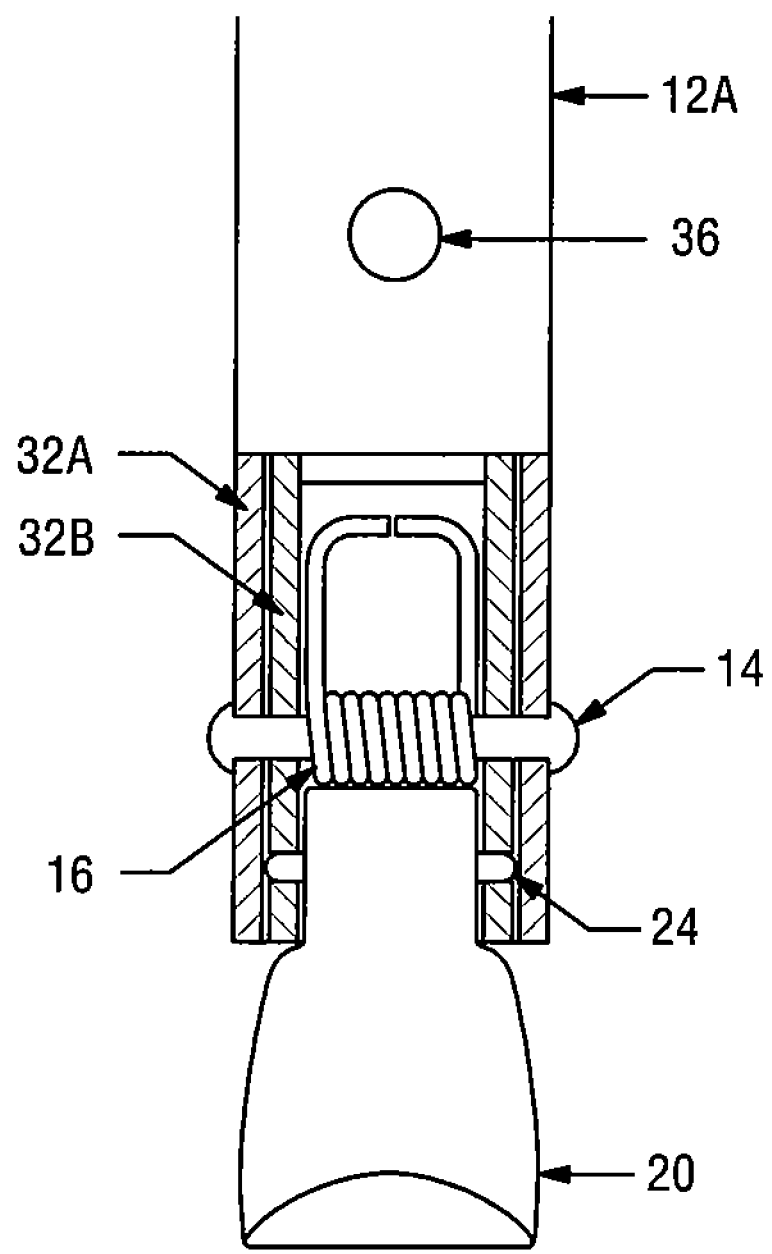
FIG. 4 is a detailed view of area A of FIG. 3.

Tongs 10 have a pair of arms 12A, 12B. Arms 12A, 12B have forward functional ends 30A, 30B and rear attachment ends 32A, 32B. Preferably, the arms are nested together at their attachment ends 32A, 32B, such as by overlapping flanges. The attachment ends 32A, 32B are pivotably joined at a main pivot 14. The nested attachment ends 32A, 32B define a channel between them, as can be seen in FIG. 4.

Figures 5, 6:
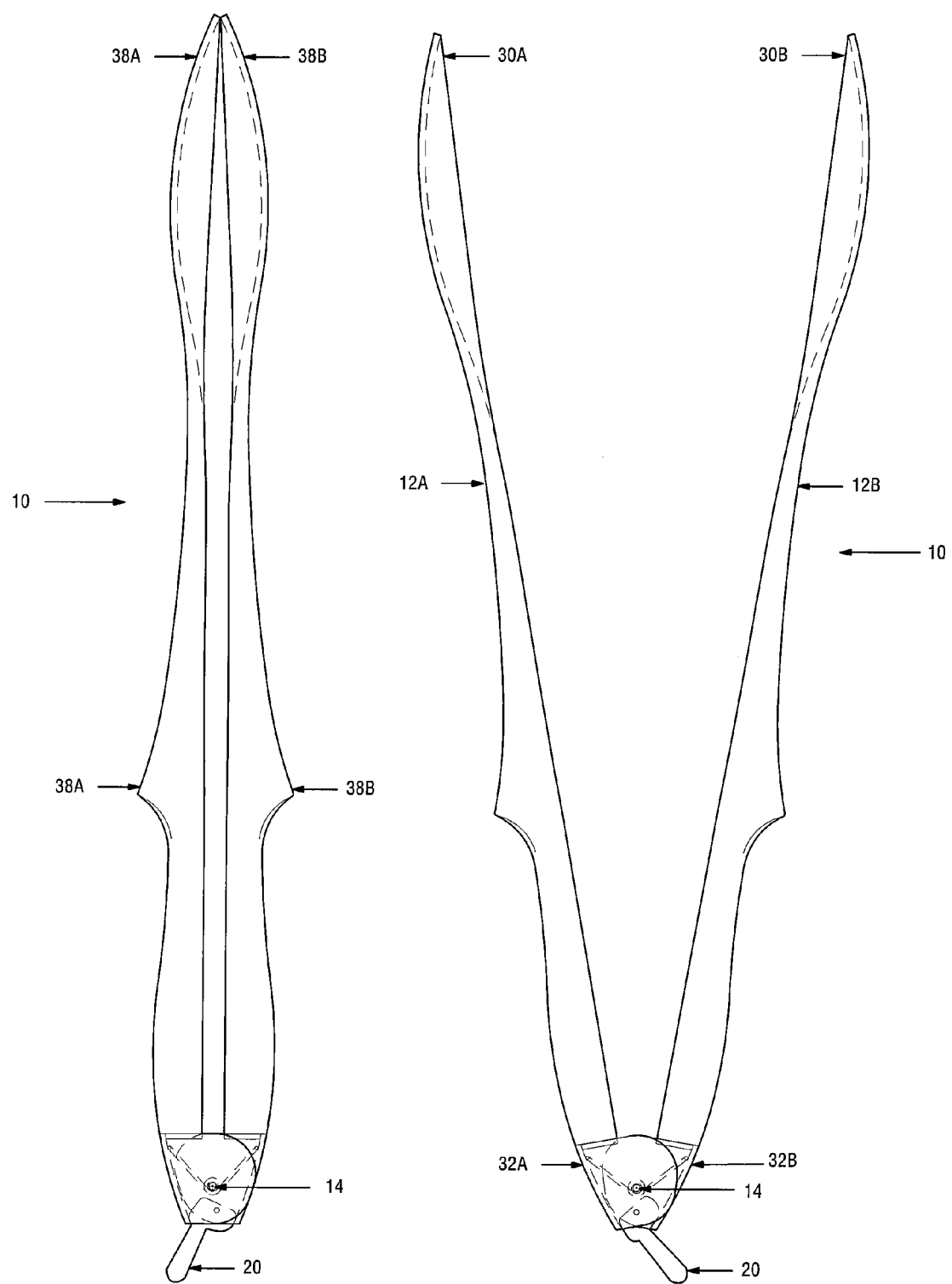
FIG. 5 is another isometric view of a locking utensil, in closed and locked position.
FIG. 6 is an isometric view of the locking utensil of FIG. 5, in open and unlocked position.
Figure 7:
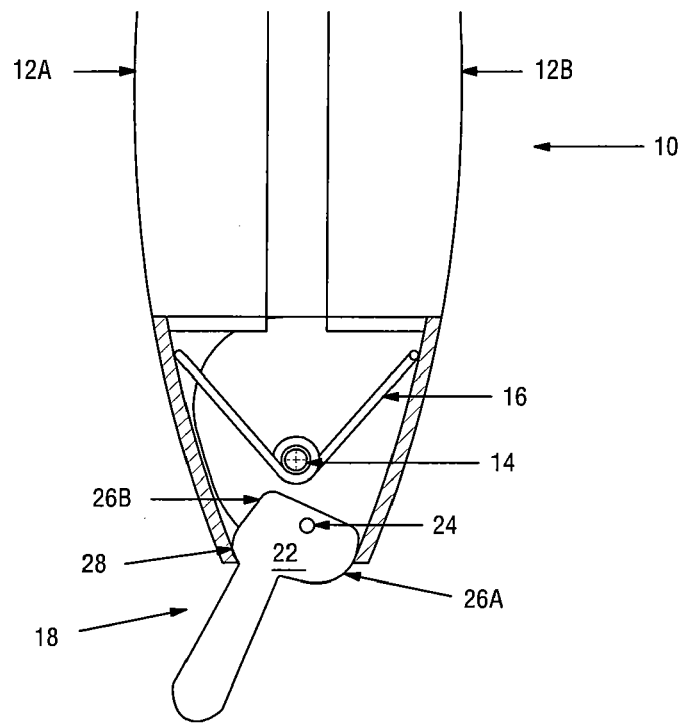
FIG. 7 is a detailed view of a locking mechanism for locking utensils, according to the invention. The locking mechanism is shown in closed and locked position.
Figure 8:
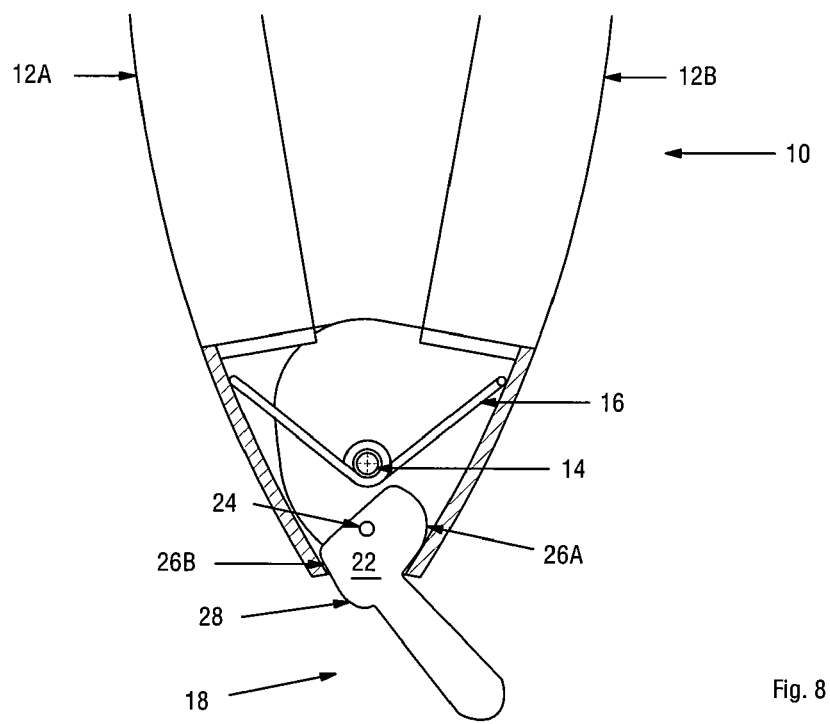
FIG. 8 is a detailed view of the locking mechanism of FIG. 7 in open and unlocked position.

A spring, disposed in the channel, is used to bias the arms into open position (as shown in FIGS. 2, 6, 8) except when arms 12A, 12B are manually brought (squeezed) together for gripping an item or when locked (as shown in FIGS. 1, 5, 7). The spring may be any shape or style that can be disposed on or between the arms proximate to the attachment ends to bias the functional ends apart. As shown in FIGS. 4, 7 and 8, the spring 16 may be a torsion spring having a central coil part and a pair of free ends. The coil part may surround the main pivot 14, as shown in FIG. 4. The free ends of the spring are used to force the arms 12A, 12B apart. Another possible spring is a simple strip of resilient metal (e.g. a leaf spring—not shown), which may be curved in a generally U-shaped configuration, a side connected with each arm of the utensil to achieve the same biasing effect.

In use, the spring-armed utensil 10 allows for gripping or pressing various food items. The arms are pinched together manually against the outward force of the spring. When force is removed, the arms 12A, 12B return to sprung (open) position.

The utensil is provided with a locking mechanism 18 to retain the arms 12A, 12B together when not in use (such as to facilitate compact storage or prevent catching on other articles). The locking mechanism is best seen in FIGS. 7 and 8.

To lock the arms together, cam 22 is rocked into locking position using actuator tab 20 (as shown in FIG. 7). The cam 22 pivots independently of the main pivot 14 at its own cam pivot 24. The cam 22 has an eccentric shape (shown here as a distorted four-sided shape). The cam has two opposite sides 26A, 26B that correspond roughly to the sides of the body of the utensil 10. When rocked into locking position, shoulder 28 of the cam catches on an inside surface of the channel defined between arms 12A, 12B at their attachment (flange) ends 32A, 32B. This frictional attachment (an interference fit) retains the arms against free movement thereby keeping the utensil locked, until the cam 22 is released.

It will be noted that, although preferably situated proximate to the spring 16, the cam 22 actually has no direct effect on the spring 16. The cam in its rocking motion (an arc) avoids the main pivot 14 and spring 16 entirely. Thus, the locking mechanism is very simple and does not rely on interaction between moving parts, minimizing wear.

Actuator tab 20 is preferably (but not necessarily) unitary with the cam. The actuator tab 20 is capable of rocking motion in the manner of a light switch. Extending out of the channel within which the cam 22 is provided, the actuator tab 20 is easily accessible and manipulable, requiring no great degree of force to operate by the user. In fact, it is contemplated that the user could operate the locking mechanism 18 one-handed. That is, one hand may be used to hold the arms together while the actuator tab 20 may be switched to locking simply by swiping the tab against the user's leg, or some other surface. The tab 20 moves smoothly in one arc. The user does not need to push the tab 20 inward to force the blocking effect of the cam 22. The cam's rotation (rocking) brings the shoulder 28 smoothly into contact with the inside surface of the channel defined between the ends 32A, 32B. Unlocking the mechanism is a simple matter of reversing the actuator tab 20 which un-catches the shoulder 28, freeing the arms 12A, 12B again.

Various shapes of cams may be used, not necessarily following the general shape shown in the Figures. Dimensioning of the cam is critical to achieving the desired function. Zero tolerance at the point where the shoulder 28 meets the inside surface is desirable.

The cam is preferably of a different material than the arms and their attachment ends. The cam may be a non-metal. One desirable material is nylon, which has good wearing properties, will not crack or distort, and has a good frictional coefficient against a steel arm. The actuator tab may be unitary with the cam or a separate piece. The material of the actuator tab is not as critical, however, nylon may also be desirable for the same reasons.

The utensil 10 itself is preferably metal or a rigid plastic. Stamped steel is one preferred material for the arms 12A, 12B. The arms 12A, 12B may be hollow or solid body. The arms 12A, 12B may include handle segments 34A, 34B of a different material, as shown in FIGS. 1-3. The handles may be attached by rivets 36. The handles may consist of a hollow or solid section of the arm, or they may consist of covered or coated sections of the arms. The arms 12A, 12B may be shaped various ways. Preferably, for comfort and aesthetics, the weight is balanced along the length of the utensil 10. The outsides of the arms may be straight or shaped. In one embodiment, the arms 12A, 12B comprise raised projections 38A, 38B at about mid-length, shaped as a thumb rest. The projections 38A, 38B add to the visual appeal of the utensil and also provide a balance point for resting the utensil 10 on either side, while preventing the functional ends 32A, 32B from touching the surface on which the utensil is resting.

Various shapes and configurations of forward functional ends 30A, 30B are possible. The function ends may have flat forward ends that lie flat and parallel against each other in closed position. Alternatively, another cooperating relationship is possible, such as twin bowl-shaped ends (in mirror image of each other), as shown particularly in FIGS. 5-6. One or both of the functional ends 30A, 30B may be slotted, or have other features, such as teeth, fingers or tines (not shown). Edges of the functional ends may be smooth or rough as desired for the particular application. The functional ends 30A, 30B may come together completely in closed position or may be designed with a small or large gap between them, such as to prevent crushing delicate items, or to accommodate large items. The forward functional ends may be of the same material as the arms, or may use separate pieces. The ends, separate or unitary, may be coated or overmoulded to provide desirable characteristics for food handling, durability, heat-resistance, non-stick, or for compatibility with particular types of cookware.

Although tong-styled functional ends are shown (which are matching or mirror opposites), it is contemplated that the functional ends may be cooperating but non-matching, such as a pointed end and a ring/bowl-shaped end for a pitter (for pitting stone fruits or olives). Or, one end may be a chamber (with or without holes) and the other end a press plate, the ends cooperating as a garlic press, nut cracker or potato ricer, for instance.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A locking utensil, comprising:
   a pair of arms each having a forward functional end and a rear attachment end;
   the arms being nested together at their attachment ends and pivotably fastened together at a main pivot, the nested attachment ends defining a channel between them;
   a spring disposed in the channel to bias the functional ends of the arms outward to an open position, except when the arms are brought together for gripping an object or for locking the arms in a closed position; and
   a locking assembly comprising:
      a cam disposed in the channel and pivotable therein in a rocking motion independently of the main pivot; the cam being eccentrically shaped and having two opposing sides, one of the sides having a projecting shoulder dimensioned to frictionally engage an inside surface of the channel when the shoulder side of the cam is rocked into contact with said surface, to thereby releasably retain the arms in locking engagement in the closed position; and
      an actuator tab extending at least partway out of the channel for rocking the cam side to side into and out of locking engagement.

2. The locking utensil of claim 1, wherein the cam and the actuator tab comprise a unitary piece.

3. The locking utensil of claim 1, wherein the cam comprises a nylon cam.

4. The locking utensil of claim 1, wherein the actuator tab and the cam comprise a unitary nylon piece.

5. The locking utensil of claim 1, wherein the spring is proximate to the main pivot.

6. The locking utensil of claim 1, wherein the spring comprises a torsion spring.

7. The locking utensil of claim 1, wherein the cam comprises a separate pivot from the main pivot.

8. The locking utensil of claim 1, wherein an arc described by the cam in the rocking motion does not contact the spring at any point.

9. The locking utensil of claim 1, wherein the cam comprises a second shoulder on the opposite side of the cam from the shoulder, the second shoulder contacting a second inside surface of the channel in locking engagement.

10. The locking utensil of claim 1, wherein the utensil comprises stamped metal arms.

11. The locking utensil of claim 1, wherein the utensil comprises stamped steel arms.

12. The locking utensil of claim 1, wherein the arms are substantially hollow.

13. The locking utensil of claim 1, wherein the rear attachment ends of the arms comprise flanged ends dimensioned to nest one arm within the other arm.

14. The locking utensil of claim 1, wherein the utensil comprises a handle portion on each arm proximate to the attachment ends.

15. The locking utensil of claim 1, wherein the shapes of the functional ends of the arms are mirror images of each other.

16. The locking utensil of claim 1, wherein the shapes of the functional ends of the arms are identical.

17. The locking utensil of claim 1, wherein the utensil is a tongs.

18. The locking utensil of claim 1, wherein the utensil is a gripping utensil.

19. The locking utensil of claim 1, wherein the functional ends comprise contact surfaces that are substantially bowl-shaped.

20. A locking tongs, comprising:
    a pair of arms each having a forward functional end and a rear attachment end;
    the arms being nested together at their attachment ends and pivotably fastened together at a main pivot, the nested attachment ends defining a channel between them;
    a biasing means disposed in the channel to bias the functional ends of the arms outward to an open position, except when the arms are brought together for gripping an object or for locking the arms in a closed position; and
    a locking assembly comprising:
       a cam disposed in the channel and pivotable therein in a rocking motion independently of the main pivot; the cam having a projecting shoulder dimensioned to frictionally engage an inside surface of the channel when the shoulder is rocked into contact with said surface, to thereby releasably retain the arms in locking engagement in the closed position; and
       an actuator tab extending at least partway out of the channel for rocking the cam into and out of locking engagement.

* * * * *